Dec. 4, 1923.
A. L. STAPLES
ROLLER SKATE ROLL
Filed July 22, 1921
1,476,550
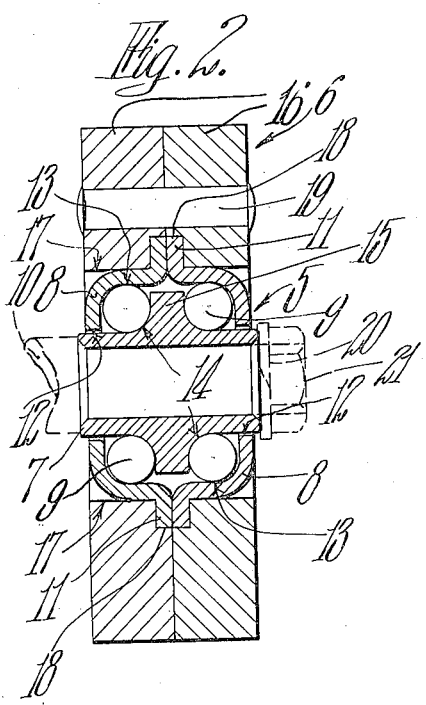
INVENTOR
Arthur L. Staples
BY
Chapin & Neal
ATTORNEYS.

Patented Dec. 4, 1923.

1,476,550

UNITED STATES PATENT OFFICE.

ARTHUR L. STAPLES, OF NEW HAVEN, CONNECTICUT, ASSIGNOR TO WINCHESTER REPEATING ARMS COMPANY, OF NEW HAVEN, CONNECTICUT, A CORPORATION OF CONNECTICUT.

ROLLER-SKATE ROLL.

Application filed July 22, 1921. Serial No. 486,786.

*To all whom it may concern:*

Be it known that I, ARTHUR L. STAPLES, citizen of the United States, residing at New Haven, in the county of New Haven and State of Connecticut, have invented new and useful Improvements in Roller-Skate Rolls, of which the following is a specification.

The present invention relates to skate rolls, and more particularly to ball-bearing skate rolls of the type wherein the tread is formed of a plurality of disk-like or annular members of fibre, wood, or other similar substance.

The object of the invention is to provide a skate roll of the general character above indicated, which shall be of simple, rugged and thoroughly practical construction, having a minimum number of compactly arranged parts, all of which are inexpensive to manufacture and having a bearing constructed and arranged to provide direct support for the several component members of the tread element, and which is to a great extent protected from dust and dirt.

To this end the invention consists in the features of construction and the combinations and arrangements of parts hereinafter described and particularly pointed out in the appended claims.

The invention will be readily understood from a description of the preferred embodiment thereof, illustrated in the accompanying drawings, in which,—

Fig. 1 is a side elevational view of a roll constructed in accordance with the present invention;

Fig. 2 is a sectional view taken on the line 2—2 of Fig. 1; and

Figs. 3 and 4 are detail views, in side elevation, of certain of the bearing members.

Referring to the drawings, the improved roll comprises a ball-bearing unit 5 and an annular tread-forming element 6 which encircles the bearing unit.

The bearing unit 5 consists of a central spindle or cone member 7, a cup member composed of two separable ball cups 8, which are carried and held together by the tread-forming element, and a plurality of balls 9 which are interposed between the cone member and the ball cups. As shown, the cone member 7 is made in the form of a sleeve adapted to be carried by an axle or trunnion 10, and the ends of said cone member are slightly extended as shown beyond the faces of the ball cups 8 so as to be clamped between a shoulder of the axle 10 and the usual lock washer 20 and nut 21 for securely fastening the bearing upon the axle. The ball cups 8 are constructed with outwardly turned rims or flanges 11 and are arranged with these rims abutting and with the body portions of the cups bulging in opposite directions. The ball cups are provided with central openings 12 through which the opposite ends of the cone sleeve project, the openings 12 permitting a slight clearance between the cone sleeve and the cups. The balls 9 are adapted to roll in two raceways formed by the cooperation of the inner surfaces 13 of the ball cups with cone faces 14 that are formed adjacent opposite sides of a central annular flange 15 on the exterior of the cone sleeve. The flange 15 separates the two rows of balls and serves to retain the cone sleeve against longitudinal displacement.

The tread-forming element 6 is composed of a plurality of disks 16, in the embodiment shown, two in number, said disks being composed preferably of wood, fibre, or other similar tread material. The disks are centrally apertured as indicated, at 17, so that annular tread members are formed which fit closely over the ball cups 8. Preferably one end face of each apertured disk or annular tread member is recessed adjacent its inner periphery, to provide an annular recess or groove 18 for receiving the outwardly turned rim of one of the ball cups. The two disks are assembled, side-by-side, upon the ball cups with their annular recesses 18 opposed and their outer and inner peripheries in alinement, and the disks are rigidly secured together in this relation by means of rivets 19, three of which have been found to give sufficient fastening strength. When the disks are thus secured together, the outwardly turned rims 11 of the ball cups are locked within the annular recesses 18 so that all parts of the bearing unit are maintained in assembled relation. The disks fit tightly upon the sides of the ball cups and the grooves 18 are preferably made slightly shallower than the thickness of the ball cup rims 10 so that the opposed faces of the disks are slightly separated until drawn together by the rivets. This expedient insures a firm and rigid assembly of the disks and ball cups. By reason of this rigid construction the clearance between the cone sleeve 7 and the bulging portions of the ball cups may be made very small. Thus there is very little opportunity for dust or foreign matter to reach the bearings. The outwardly-bulging portions of the ball cups are substantially flush with the outer faces of the disks 16, thus giving a smooth and attractive appearance to the roll. Furthermore, the arrangement is such that the tread-forming element is supported, substantially throughout its width directly by the cup member of the bearing.

It will be apparent from the above description that in accordance with the object of the invention an improved skate roll has been provided which is of simple, durable and inexpensive construction and in which the bearings are substantially dust-proof and the tread element adequately supported thereby. Furthermore, the construction is such as to form a self-contained bearing, rigidly assembled with the roll in permanent adjustment so as to require no further attention until worn out.

It will be noted that the self-contained bearing thus shown provides for being securely fastened to the axle of the skate without disturbing the fixed adjustment of the bearing. The sleeve cone member 7 receives the entire clamping action of the nut 21 in securing the bearing in place against the shoulder of the axle 10 and consequently there is no possibility of binding the cup member and tread against free rotation in screwing up the nut 21 as is the case with skate rolls heretofore made.

While the tread-forming element of the roll has been herein illustrated and described as composed of two disks it is obvious that the number of disks may be varied as desired so long as suitable provision is made for receiving the rims of the ball cups in annular recesses or grooves in the tread element adjacent the central transverse plane thereof. It is also to be understood that while the specific construction and arrangement of parts herein described is at present preferred, the invention is not limited thereto except so far as defined in the following claims, and that such construction and arrangement may be variously changed and modified without departing from the spirit and true scope of the invention.

What is claimed is:

1. In a skate roll, the combination of tread-forming disks provided with central openings, said disks having their side faces in abutting contact and their peripheral edges arranged to constitute the tread surface of the roll, ball cups in said openings having flanges extending betweeen abutting faces of said disks, and means for binding together the disks and the interposed flanges of the ball cups.

2. In a skate roll, the combination of tread-forming disks provided with central openings and having their side faces in abutting contact and their peripheral edges arranged to constitute the tread surface of the roll, the abutting faces of the disks having annular recesses adjacent said central openings, means for holding said disks together, and ball cups adapted to fit in said openings, said ball cups having flanges adapted to project into said recesses for holding the ball cups in position.

3. In a skate roll, the combination of two annular members arranged with their side faces in abutting contact and with their outer peripheries constituting the tread surface of the roll, the central aperture at the proximate sides of said annular members being enlarged to form a groove at the inner periphery of said annular members, ball cups encircled by said members and having flanges held in said groove, and means for rigidly securing together said members.

4. In a skate roll, the combination of a solid annular tread-forming element having an annular groove in its inner peripheral face, said groove having side walls parallel to the lateral faces of said element and a cup member encircled by the tread-forming element and having a flange fitting tightly within said annular groove.

5. In a skate roll, the combination of two tread forming disks each centrally apertured and having an annular recess in one lateral face adjacent said aperture, the disks being arranged with said recesses opposed to form an annular groove and the unrecessed portions of the proximate lateral faces of the disks being in abutting contact throughout their entire areas and with the peripheral edges of the disk alined to constitute the tread surface of the roll, ball cups within said apertures, out-turned peripheral flanges on the ball cups abutting side-to-side, said abutting flanges fitting tightly within said annular groove and clamped together by said abutting disks, and means for rigidly fastening said disks and ball cups together.

6. In a skate roll, the combination of an axle, solid annular tread forming members arranged with the side faces thereof in abutting contact and with their outer peripheries constituting the tread surface of said roll, and an anti-friction bearing located between said axle and the inner peripheries of said tread forming members, said bearing comprising a cone member on said axle, separable cup members, radially out-turned peripheral flanges on said cup members, said flanges being in abutting comtact along their radial out-turned portions and being interposed between adjacent faces of said tread members, and means to fasten said tread members together.

7. In a skate roll, the combination with a substantially solid annular tread element having a central opening, of separate ball cups in said opening having portions extending radially into the inner periphery of said annular tread element for being held together, and balls retained in said ball cups.

8. In a skate roll, the combination with a substantially annular tread element having a central opening and an annular groove at its inner periphery, of separate ball cups in said opening having radially extending flange portions in said groove for being held together, and balls retained in said ball cups.

9. In a skate roll, the combination with a plurality of annular discs in abutting side by side relation to form a solid tread element with a central opening, means to hold said discs together, of separate ball cups in said opening having portions received between abutting faces of said discs for being held together, and balls retained in said ball cups.

10. In a skate roll, the combination with a plurality of annular discs in abutting side by side relation to form a solid tread element with a central opening and means to hold said discs together, of separate ball cups having portions received between abutting faces of said discs for being held together, and balls retained in said cups.

11. In a skate roll, the combination with a plurality of annular discs in abutting side by side relation to form a solid tread element with a central opening, means to hold said discs together, the tread element thus formed having an annular groove at its inner periphery, of separate ball cups in said opening having radially extending flange portions in said groove for being held together, and balls retained in said ball cups.

12. In a skate roll in combination, an axle, a plurality of annular discs in abutting side by side relation to form a solid tread element with a central opening, means to hold said discs together, and an anti-friction bearing located between said axle and the inner periphery of said tread element, said bearing comprising a cone member on said axle, and cup members having portions received between abutting faces of said discs for being united therewith.

13. In a skate roll in combination, an axle, a plurality of annular discs in abutting side by side relation to form a solid tread element with a central opening, means to hold said discs together, and an anti-friction bearing located between said axle and the inner periphery of said tread element, said bearing comprising a cone member on said axle, and separate ball cups having abutting flanges interposed between adjacent faces of said annular discs.

In testimony whereof I have affixed my signature.

ARTHUR L. STAPLES.